March 27, 1951 C. D. OVERLY 2,546,866
APPARATUS FOR ARRANGING AND DELIVERING BOLTS OR THE LIKE
Filed Dec. 13, 1945 8 Sheets-Sheet 1

Fig. 1.

INVENTOR
Charles D. Overly
by his attorneys
Stebbins, Blenko & Webb March 27, 1951 C. D. OVERLY 2,546,866
APPARATUS FOR ARRANGING AND DELIVERING BOLTS OR THE LIKE
Filed Dec. 13, 1945 8 Sheets-Sheet 2

INVENTOR
Charles D. Overly
by his attorneys
Stebbins, Blenko & Webb

March 27, 1951 C. D. OVERLY 2,546,866
APPARATUS FOR ARRANGING AND DELIVERING BOLTS OR THE LIKE
Filed Dec. 13, 1945 8 Sheets-Sheet 4

INVENTOR
Charles D. Overly
by his attorneys
Stebbins, Blenko
& Webb

March 27, 1951  C. D. OVERLY  2,546,866
APPARATUS FOR ARRANGING AND DELIVERING BOLTS OR THE LIKE
Filed Dec. 13, 1945  8 Sheets-Sheet 5

INVENTOR
Charles D. Overly
by his attorneys
Stebbins, Blenko
& Webb

March 27, 1951  C. D. OVERLY  2,546,866
APPARATUS FOR ARRANGING AND DELIVERING BOLTS OR THE LIKE
Filed Dec. 13, 1945  8 Sheets-Sheet 6

INVENTOR
Charles D. Overly
by his attorneys
Stebbins, Blenko & Webb

March 27, 1951  C. D. OVERLY  2,546,866
APPARATUS FOR ARRANGING AND DELIVERING BOLTS OR THE LIKE
Filed Dec. 13, 1945  8 Sheets-Sheet 8

Fig.17

INVENTOR.
Charles D. Overly
BY
Mackey + Burden
HIS ATTORNEYS

Patented Mar. 27, 1951

2,546,866

UNITED STATES PATENT OFFICE 2,546,866

APPARATUS FOR ARRANGING AND DELIVERING BOLTS OR THE LIKE

Charles D. Overly, Pittsburgh, Pa., assignor to Oliver Iron and Steel Corporation, Pittsburgh, Pa., a corporation of Pennsylvania Application December 13, 1945, Serial No. 634,848

3 Claims. (Cl. 10—165)

This invention relates to apparatus for conveying bolts or like articles from a point at which they are stored in random positions, to a machine for subjecting them to further processing. Particularly, it concerns apparatus for repeatedly picking up small quantities of bolts, arranging them side-by-side in vertically suspended relation, and conveying them to a magazine from which they may be fed successively to a processing machine.

In the manufacture of bolts or the like, it is necessary, after the preliminary operations of heading and cutting the shanks to length, to deliver the semi-finished product to machines for further processing, such as pointing and threading. While mechanisms for performing these operations have been known heretofore, they are open to certain objections because of their complexity of construction, difficulty of maintenance and lack of continuity in operation. I have invented improved apparatus for mechanically picking up bolts from a container, arranging them side-by-side in orderly fashion and delivering them to a magazine. In a preferred embodiment of my invention, I provide an elevator adapted to pick up bolts from a storage hopper, and a trough having sloping side walls and a bottom slot for receiving the bolts from the elevator and arranging them in erect position, suspended by their heads, and in position to be advanced side by side, and a magazine communicating with the slot and adapted to deliver the bolts to a processing machine. The receiving trough slopes upwardly toward its discharge end and is provided with pusher means for advancing successive bolts. The pusher means is arranged to release bolts which have not become properly positioned so they may slide back down the trough and become properly positioned before being fed forward again.

I provide novel control means on the magazine whereby operation of the apparatus is stopped when a predetermined quantity of bolts has accumulated therein. In order to reduce the frequency of starting and stopping, I also provide means for restarting the apparatus only when the quantity of bolts in the magazine has been reduced to a predetermined minimum. In addition, I provide means for detecting bolts having shanks of excessive length and stopping the machine for subsequent processing in order to protect it from damage thereby.

Various other novel features and advantages of the apparatus of my invention will become apparent during the following detailed description thereof which refers to the accompanying drawings illustrating the preferred embodiment.

Figure 1:
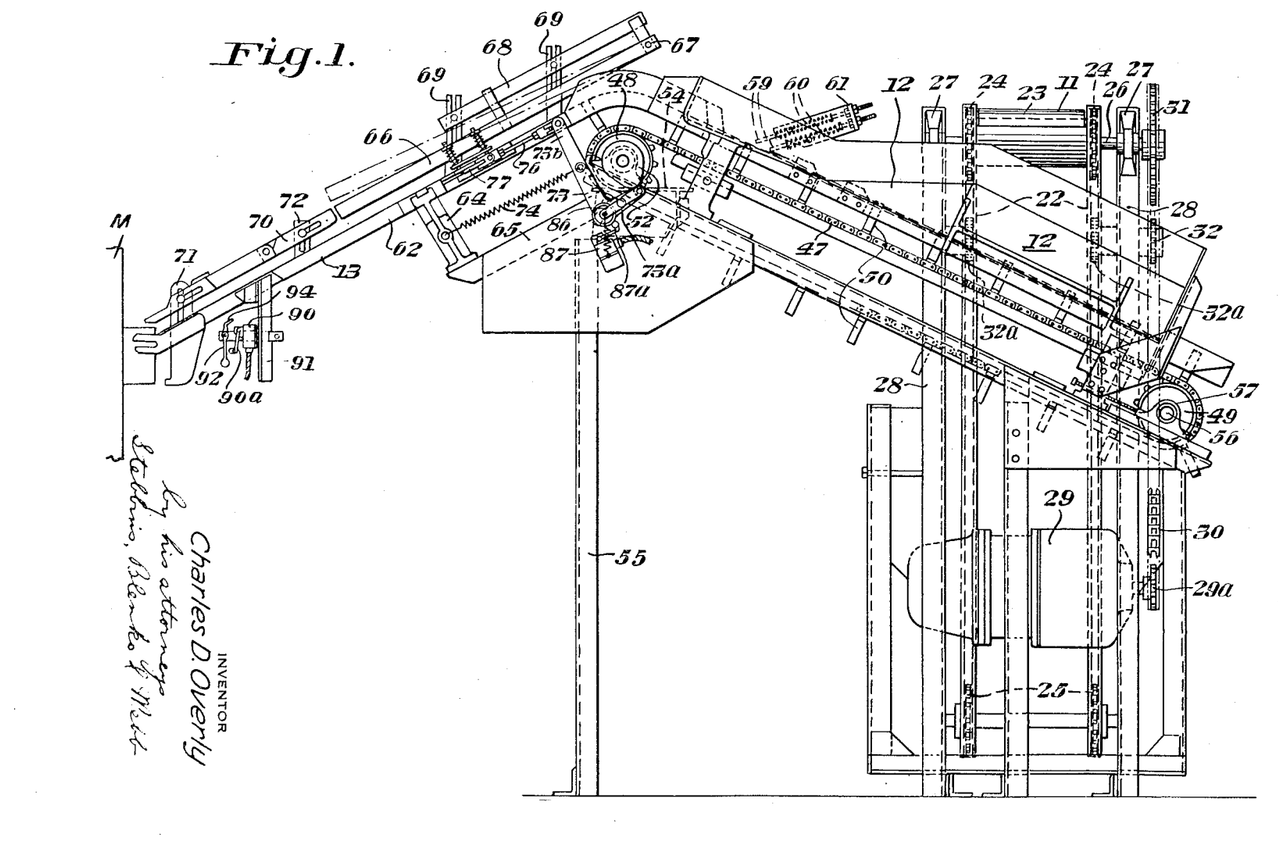
Figure 1 is a side elevation of the apparatus as a whole.
Figures 2, 3:
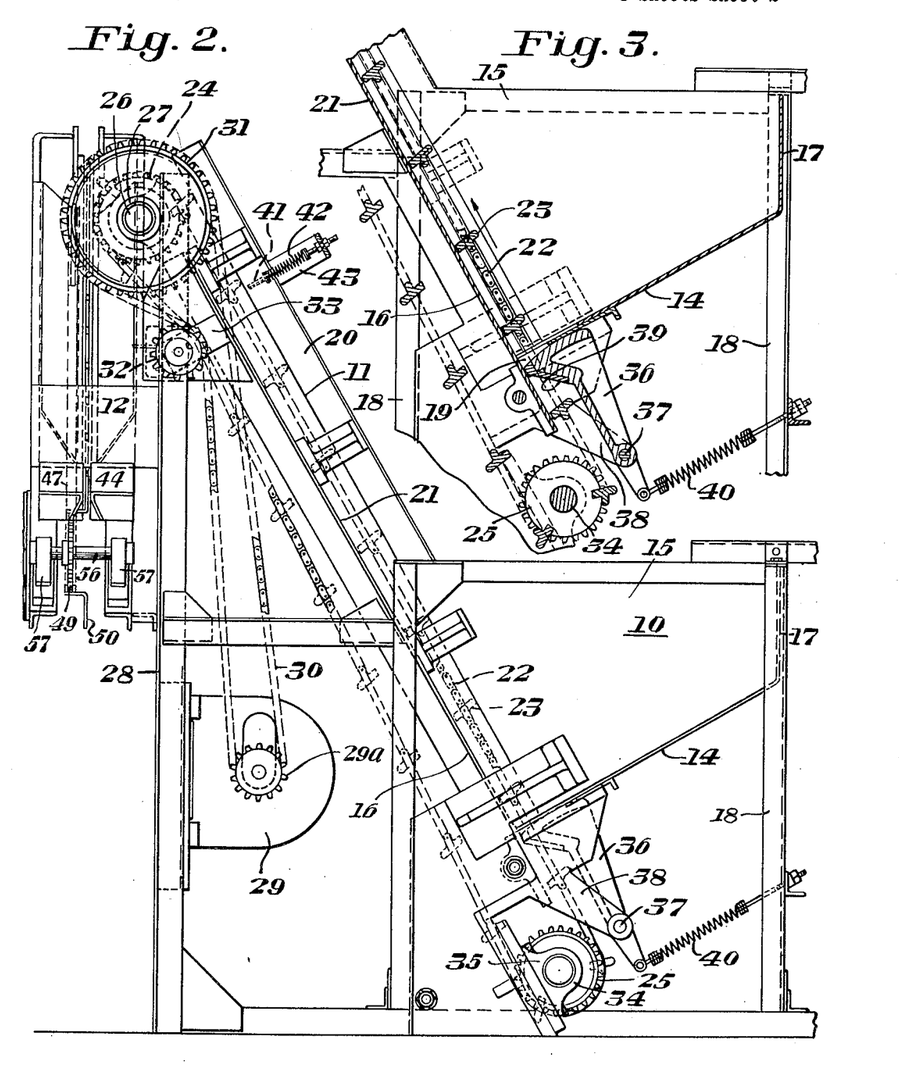
Figure 2 is an end elevation thereof.
Figure 3 is a vertical central section through the storage hopper.

Referring in detail to the drawings and, for the present, to Figures 1 through 3, the apparatus of my invention is adapted to gather bolts from a storage receptacle and deliver them in alinement and in orderly succession to the mechanism indicated at M for further processing, such as pointing, threading, etc. The bolts to be arranged and delivered are dumped into a storage hopper 10 after the bar stock from which they are made has been cut to the proper length of shank and headed. An elevator 11 raises the bolts in small groups from the hopper 10 and delivers them to a receiving trough 12 which is inclined upwardly toward its discharge end. A magazine 13 inclined downwardly toward the mechanism M receives bolts from the trough and supports them in position for delivery one-by-one to the processing mechanism.

The hopper 10 comprises a box of metal plate having a sloping bottom 14, side walls 15 and end walls 16 and 17. These walls are supported in a frame 18 of structural members. The end wall 16 is also sloped, being substantially normal to the bottom 14. The bottom, furthermore, terminates short of the end wall 16 leaving an opening 19. The construction of the hopper is such, by reason of the sloping bottom, that it may be designed to accommodate almost any desired quantity of bolts, thus reducing the frequency of reloading.

The elevator 11 includes a guide channel having sides 20 and a bottom 21 which is a continuation of the end wall 16 of the hopper 10. Spaced conveyor chains 22 having flights or lifts 23 spaced therealong are adapted to ride in the guide channel of the elevator 11. The chains are trained over drive sprockets 24 at the upper end of the conveyor and idler sprockets 25 at the lower end. The sprockets 24 are secured to a shaft 26 journaled in bearings 27 mounted on columns 28. The shaft 26 is driven by a variable speed motor-reducer 29 also secured to the columns 28, through a chain-and-sprocket drive 30. This drive includes a sprocket 29a on the shaft of the motor-reducer, a sprocket 31 on the shaft 26 and the chain therebetween which travels over a guide sprocket 32 carried on one of the columns 28. The chains 22 travel over similar guide sprockets 32a journaled on brackets 33 secured to the bottom of the channel of the elevator 11. The sprockets 25 are mounted on a shaft 34 journaled in brackets 35. These brackets are secured to the framework of the hopper 10.

As shown in Figure 3, the chains 22 with their flights 23 travel upwardly through the hole 19 in the bottom 14 of the hopper 10 and along the end wall 16 thereof. Bolts dumped helter-skelter into the hopper will thus be picked up by the flights in small groups and carried upwardly along the conveyor channel. In order to prevent the bolts in the hopper 10 from falling through the hole 19 in the interval between the passage of successive flights, I provide a closure 36. The closure may conveniently be in the form of a casting extending across the width of the elevator and having arms at each end thereof. By means of these arms, the closure is pivoted on a shaft 37 supported in lugs 38 depending from the sides of the hopper. The closure has a sloping face adjacent the end wall 16 of the hopper which is provided with a renewable wear plate 39 adapted to be engaged by the edges of the flights 23 as they start on their upward travel. The closure 36 is thus pushed to one side by each succeeding flight to permit the latter to pass through the hole 19. Between the passages of successive flights through the hole, the closure is maintained in the illustrated position by means of a tension spring 40 pivotally connected to an extension from one of the arms of the closure and to the supporting frame of the hopper.

Striker fingers 41 are spaced across the channel of the elevator 11, being mounted on flexible springs 42 secured to a cross member 43. These fingers serve to brush off any excess of bolts carried by the several flights.

Figure 4:
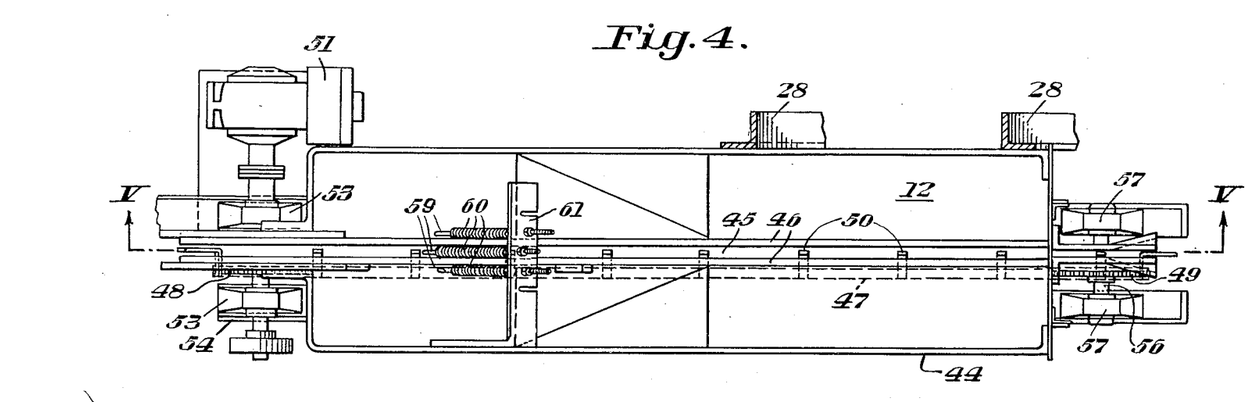
Figure 4 is a partial plan view showing the receiving trough.
Figure 5:
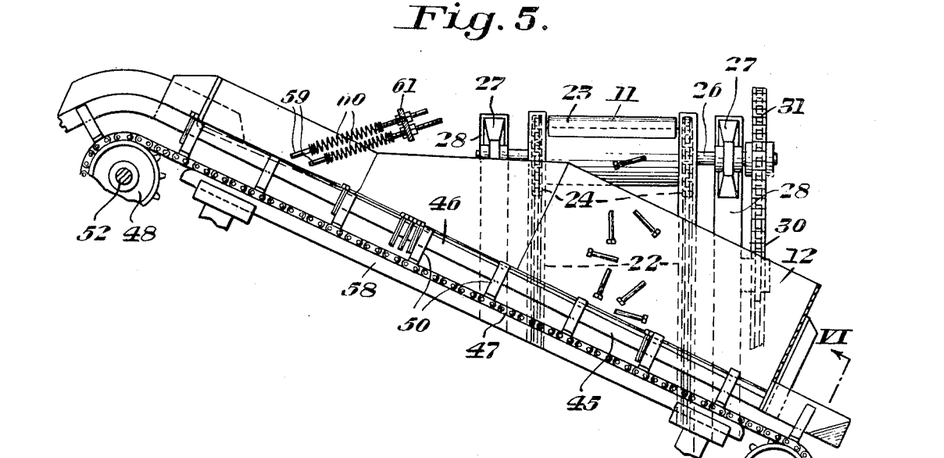
Figure 5 is a partial section through the trough taken substantially along the plane of line V—V of Figure 4.
Figure 6:
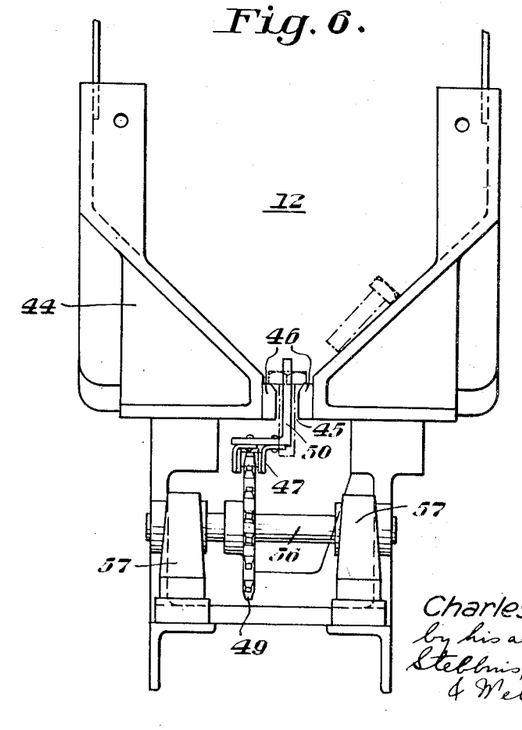
Figure 6 is an elevation of the lower end of the receiving trough with end plate removed taken along the plane of line VI—VI of Figure 5.
Figure 7:
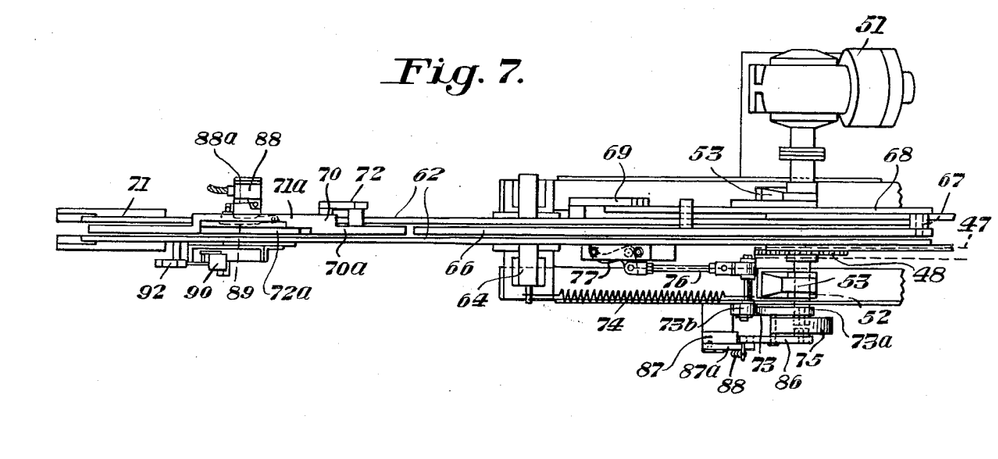
Figure 7 is a partial plan view of the magazine.

The receiving trough 12 as shown in Figures 4 through 6 comprises a box 44 having spaced bottom walls sloping toward a slot 45 extending centrally therealong. Guide rails 46 are secured to the opposite sides of the box and define the slot 45. The trough is tilted upwardly toward the discharge end and the bolts delivered thereto by the elevator 11 are moved upwardly along the rails 46 after falling down along the sloping bottom walls of the box 44. The bolts carried by the flights 23 are distributed along the length thereof, i. e., across the width of the elevator. They are thus distributed longitudinally of the slot. Some of the bolts descend immediately into traveling position between the rails 46 as shown in chain lines in Figure 6. Others lie in random positions in the box but are jostled by the movement of the already positioned bolts so that they soon fall into proper position with their shanks in the slot and their heads riding on the rails 46.

The means for moving the bolts along the rails comprises a traveling chain 47 trained over a drive sprocket 48 at the upper end of the trough and an idler sprocket 49 at the lower end. The chain has pusher fingers 50 spaced therealong adapted to enter the slot 45. The sprocket 48 is driven by a constant speed motor-reducer 51. The sprocket is secured to a shaft 52. The bearings are supported on a bracket 44 carried by a column 55. The sprocket 49 is mounted on a shaft 56 journaled in bearings 57. These bearings are carried on brackets extending downwardly from the box 44 which is itself secured to the columns 28.

The upper run of the chain 47 travels along a guide rail 58. This rail is positioned below the rails 46 but is not precisely parallel thereto. As shown in Figure 5, the rail 58 diverges upwardly from the rails 46. At the lower ends of the rails 46, the fingers 50 project upwardly through the slot 45. At that point, therefore, they tend to push upwardly along the rails all the bolts in front of them whether properly positioned with their shanks in the slots 45 or not. As the fingers travel up the rails 46, their upper ends assume successively lower positions relative thereto, thus permitting all the bolts which have not been properly positioned to slide down the rails until engaged by a succeeding finger. In this way, proper positioning of all the bolts reaching the upper end of the rails 46 is practically assured. A series of monitor fingers 59 are mounted on flexible springs 60 secured to a bracket 61 extending above the rails 46. These fingers aid in dislodging any improperly positioned bolts causing them to slide down the trough for a further opportunity to straighten out so their shanks will fall into the slot 45. By the cooperation of the receiving trough, the guide rails, the pusher fingers and the monitor fingers, the bolts reaching the crest of the rails 46 are arranged in groups, each group being advanced by one of the fingers 50 with the bolts in side-by-side engagement. The bolts are thus delivered to the magazine 13, the rails 46 of the trough being continuous with similar rails extending along the magazine and designated 62.

Referring now to Figures 1 and 7 through 16, the rails 62 of the magazine are supported on a casting 64 carried on a bracket 65 secured to the column 55. A hold-down bar 66 is positioned above the upper portions of the rails 62 being pivoted at 67 to a bar 68 adjustable vertically in slotted uprights 69. Similarly, a hold-down bar 70 is positioned above the lower portions of the rails 62. This bar includes a fixed portion 70a adjustably secured to uprights 71 and 72. The bar 70 has an offset portion 71a intermediate its ends. A supplemental bar 72a is hinged to the bar 70 and lies in alinement with the end portions of the bar 70 opposite the offset portion 71a. These hold-down bars prevent the bolts from pushing up from between the rails. The hinged mounting of the bars facilitates the clearing of any jamming of the bolts at any point along the rails. The bolts normally slide down the rails 62 by gravity as they are pushed over the crest of the rails 46 by the fingers 50.

Figures 14, 16:
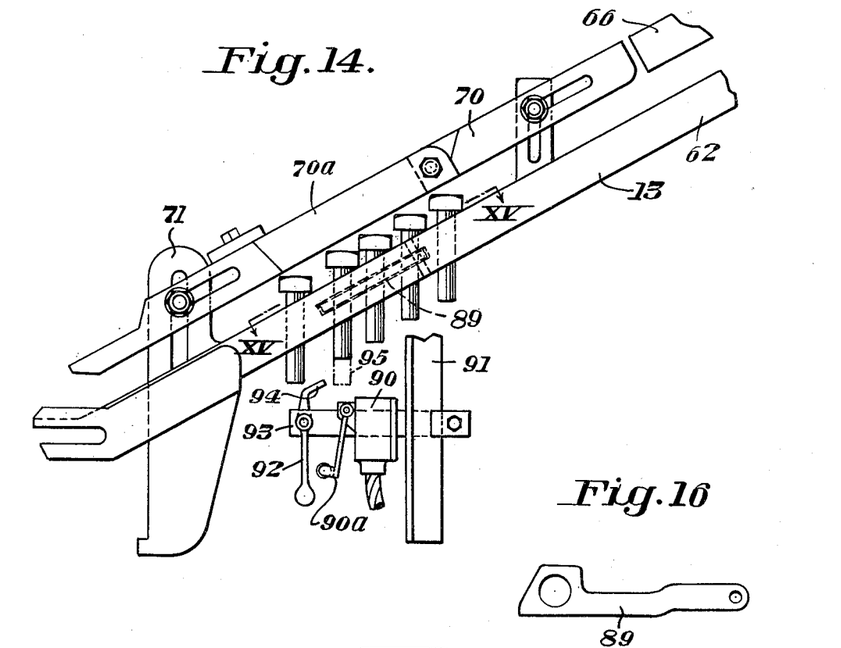
Figure 14 is a partial side elevation to enlarged scale showing the lower end of the magazine.
Figure 16 is a plan view showing the details of a switch-actuating lever.

The bolts are fed successively from the lower end of the magazine 13 to the processing mechanism M. Ordinarily, the bolts will be backed up for a predetermined distance at the lower portion of the magazine as shown in Figure 14. It will occasionally happen, however, that the bolts will pile up farther back in the magazine as a result of stoppage of the mechanism M. In order to avoid jamming, I provide means for stopping the motor-reducers 29 and 51 when the bolts pile up to a predetermined height in the magazine.

Figure 8:
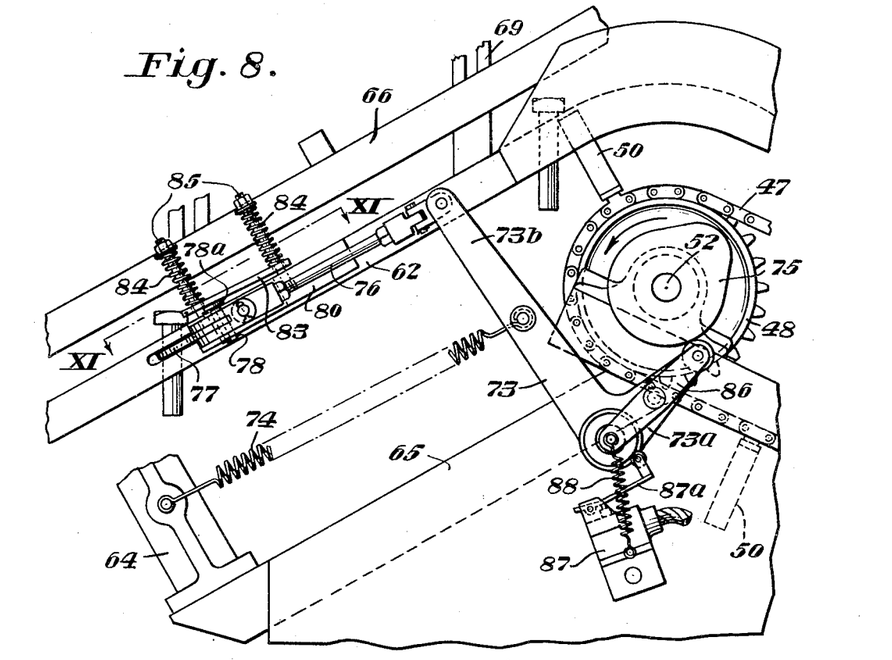
Figure 8 is a partial side elevation to enlarged scale showing the upper end of the magazine.
Figure 9:
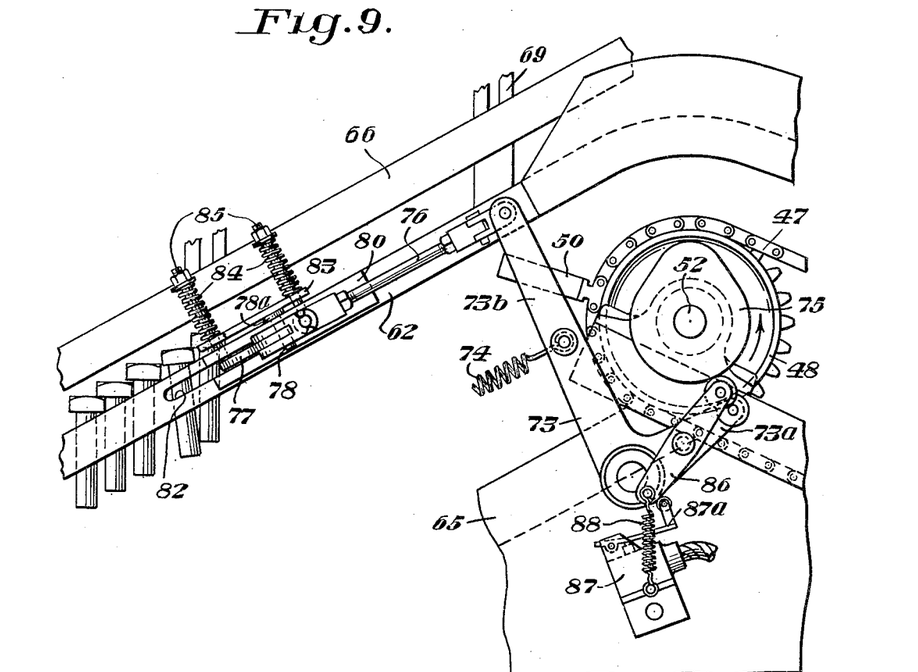
Figure 9 is a similar view showing some of the parts in alternate positions.

A bell crank 73 pivoted on the bracket 65 is normally urged in the counterclockwise direction by a tension spring 74. The shorter arm 73a of the crank has a roller journaled on the end thereof adapted to engage a cam 75 on shaft 52. Rotation of the cam with the shaft obviously causes oscillatory movement of the bell crank when the high portion of the cam engages the roller on the arm 73a of the crank.

Figure 10:
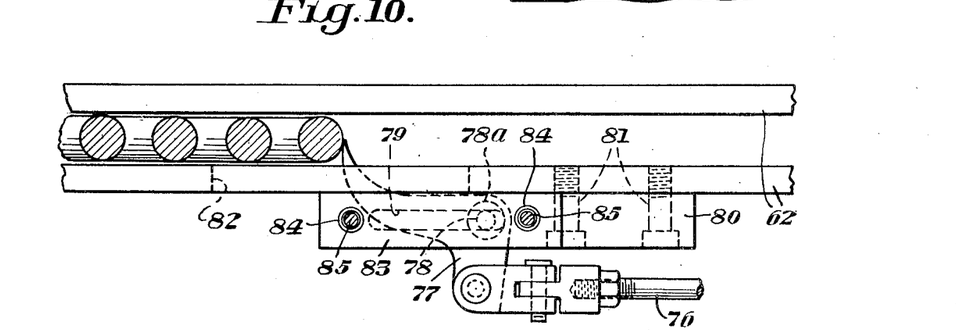
Figure 10 is a partial section taken along the plane of line X—X of Figure 9 showing a feeler finger adapted to engage the bolts in the magazine.
Figures 11, 12, 13:
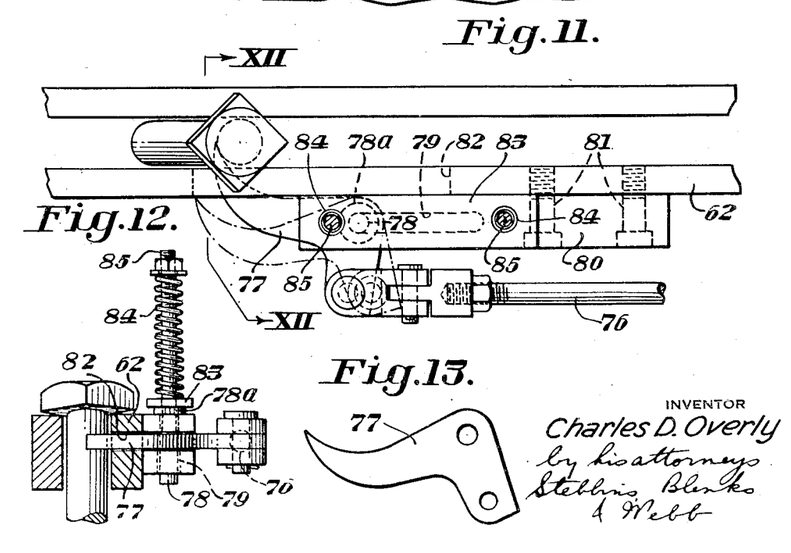
Figure 11 is a partial section taken along the plane of line XI—XI of Figure 8.
Figure 12 is a transverse section through the magazine taken along the plane of line XII—XII of Figure 11.
Figure 13 is a plan view showing the details of the feeler finger.

The longer arm 73b of the crank is connected by a link 76 including universal joints to a feeler finger 77 (see Figures 8 through 13). The finger is pivoted on a pin 78 extending through a slot 79 in a slide block 80. The block is secured to one of the rails 62 by screws 81 and is slotted to receive the feeler finger. The rail 62 is also slotted as at 82 to permit the point of the feeler finger to engage bolts piling up in the magazine, as shown in Figure 11. A friction plate 83 rests on the head 78a of the pin 78 and is urged thereagainst by springs 84, carried by studs 85 threaded into tapped holes in the block 80.

Because of the friction of the plate 83 on the head 78a of pin 78, movement of the link 76 toward the right first causes the feeler finger 77 to move from the solid-line position to the chain-line position of Figure 11. Thereafter, the feeler finger slides in the slot through the block 80, the movement of the pin being guided by the slots 79. On reverse movement of the link 76, the feeler finger will first be shifted angularly on the pin 78 from the chain-line position to the solid-line position shown in Figure 11. Thereafter, the feeler finger will slide to the left unless it is prevented from doing so by engagement with a bolt as in Figure 10. Ordinarily, therefore, when the bolts have not piled up in the magazine to an excessive degree, the feeler finger will merely reciprocate and oscillate at the end of each reciprocation.

If the bolts have piled up to the height of the feeler finger, leftward movement thereof will be prevented, as shown in Figure 10. As a result, the bell crank 73 will be arrested in the position shown in Figure 9, with its roller out of contact with the cam. Under these conditions, a lever 86 pivoted on the arm 73a of the bell crank will be tilted, causing operation of a limit switch 87. The lever 86 is urged in a counterclockwise direction by tension spring 86a but, so long as the bell crank 73 oscillates through its full angle, a roller on the upper end of the lever 86, by engagement with the cam 75, prevents angular movement of the lever. When the crank 73 is stopped in the position shown in Figure 9, however, the pivot center of the lever 86 has a position such that continued rotation of the cam permits the lever to swing, thereby engaging the actuating arm 87a of the switch 87. The operation of this switch causes the motor-reducers 29 and 51 to stop. The means whereby this stoppage is accomplished will be explained in greater detail by reference to Figure 17.

A second limit switch 88 (see Figure 15) positioned near the lower end of the magazine controls the re-starting of the motor-reducers. The operating arm 88a of the switch is engaged by a lever 89 pivoted to one of the rails 62. This lever is forced outwardly to the solid-line position of Figure 15 when bolts are piled up to the height of the lever, as shown in the drawings. When the bolts have been fed downwardly along the magazine to a point below the lever 89, it moves to the chain-line position to effect re-starting of the motor-reducers in a manner to be explained in greater detail later. Both the switches 87 and 88 are normally closed, that is, their contacts are closed until their actuating arms are operated. This causes the switches to open.

A third switch 90 mounted on an angle 91 depending from the magazine, controls the motor of the mechanism M serving to stop it when actuated. The actuating arm 90a of the switch is operated by a pendulum 92 pivoted on an arm 93 secured to the angle 91. A finger 94 rigid with the shaft of the pendulum 92 extends to a point below the path of the lower ends of the bolt shanks descending along the magazine as shown in Figure 14. If any of the bolts has a shank of excessive length, as indicated in chain lines at 95, it will by engagement with the finger 94 swing the pendulum 92 causing it to strike the actuating arm 90a of switch 90. In order to permit the motor of the mechanism M to be re-started, it is necessary to remove the over-length bolt from the magazine so that the switch 90 can reclose. This is done manually by throwing up the hinged portion of the hold-down bar 70.

Figure 17:
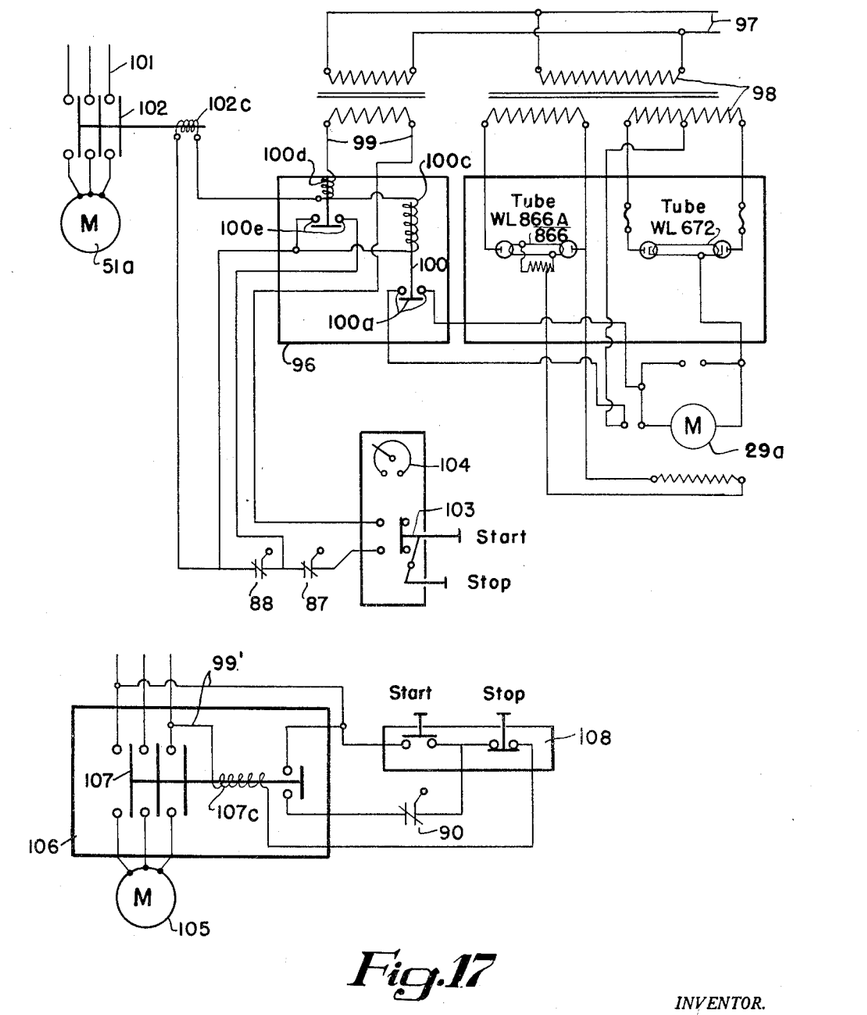
Figure 17 is a diagram showing the control circuits.

Referring now to Figure 17, the motor of the motor-reducer 29, designated 29a, is started by conventional control equipment represented diagrammatically by a relay panel 96 to which energy is supplied from a line 97 through a transformer 98. The transformer also energizes a control bus, a portion of which is shown at 99. The panel 96 includes a starting relay 100 for motor 29a.

The motor 51a of motor reducer 51 is energized directly from a supply line 101 by operation of a contactor 102 having an operating coil 102c. Starting of the motors 29a and 51a is accomplished by a push-button switch 103.

When the apparatus is being started up initially or after a previous operation during which all the bolts delivered to the magazine have been removed therefrom, the limit switches 87 and 88 will both be closed since, as above stated, they are of the normally closed type, i. e., their contacts are in engagement except when their actuating levers are operated. This being the case, operation of the push-button switch 103 completes a circuit from the right-hand side of the control bus 99 through the push-button switch 103, switches 87 and 88 and the operating coil 102c of contactor 102, to the left-hand side of the control bus. A parallel circuit is also completed through the push button and limit switches to the operating coil 100c of relay 100. The operation of contactor 102 starts motor 51a and the operation of relay 100 starts motor 29a. The panel 96 also has a relay 100d which controls contacts 100e. The above operation also closes a contact 100e which establishes a holding circuit for the coil 102c in parallel with the switch 88 so that opening of the latter will not stop the motor 51a.

Figure 15:
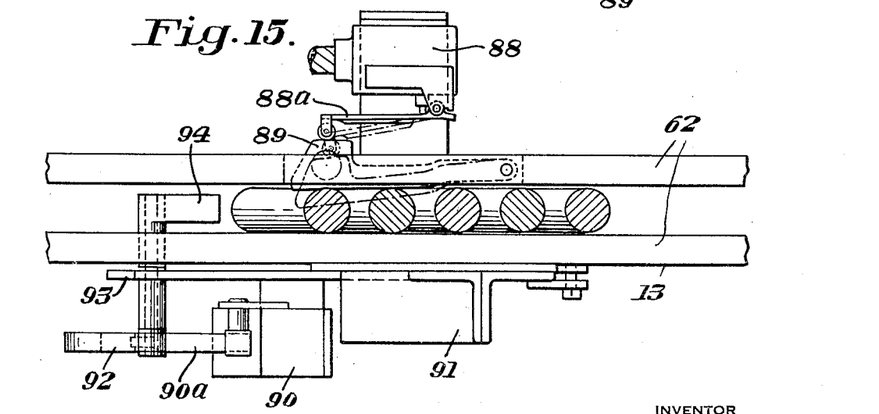
Figure 15 is a partial section taken along the plane of line XV—XV of Figure 14.

Operation of the motor 29a causes the elevator 11 to carry bolts from the storage hopper 10 up to the receiving trough 12. Operation of the motor 51a causes the conveyor chain 47 and pusher fingers 50 to feed bolts upwardly along the trough and into the magazine. As the bolts slide down the rails 62 of the magazine and into the entrance of the mechanism M, they engage the lever 89 and swing it outwardly as shown in Figure 15 causing it to engage the actuating arm 88a to open switch 88. This has no effect on the operation of the motors at this time, however, since the circuit for the coil 102c is maintained through contact 100e of relay 100.

If, during continued operation of the apparatus, the removal of bolts from the lower end of the magazine is slowed down or stopped as by a shutdown of the mechanism M bolts pile up in the magazine to a point such that reciprocation of the feeler finger 77 is prevented as shown in Figure 10, thus causing operation of the actuating arm 87a of the switch 87 as already explained. Opening of the contacts of switch 87 deenergizes both the coil 100c of relay 100 and the coil 102c of the contactor 102. Motors 29a and 51a, of course, are stopped by the opening of the contacts of relay 100 and contactor 102. Stoppage of the motors prevents further bolts from being lifted from the storage hopper by the elevator and delivered to the receiving trough 12.

The motors are re-started automatically when the operation of mechanism M has been resumed and continued long enough to cause the last bolt in the magazine to descend along the rails 62 past the lever 89. It will be particularly noted that the motors are not re-started when the last bolt in the magazine clears the feeler finger 77, since this might result in frequent starting and stopping of the motors. As shown in Figure 17, closing of the switch 87 which occurs when the last bolt in the magazine passes beyond the feeler finger does not operate either the relay 100 or the contactor 102 because the switch 88 is still held open by the bolts accumulated in the magazine. When the last bolt in the magazine passes the lever 89, the switch 88 is reclosed whereupon the previously described starting operations take place, assuming that the push button switch 103 remains closed. The motors 29a and 51a may, of course, be stopped at any time by opening the push-button switch. The motors are preferably provided with speed-control means indicated diagrammatically at 104 whereby the rate of delivering bolts to the magazine may be correlated with the rate at which they are processed in the mechanism M.

Figure 17 also illustrates the control circuit for the motor of the mechanism M. This motor indicated at 105 has a starting panel 106 including a relay 107. The operating coil 107c of this relay is connected to a control bus 99' through a push-button switch 108 and the switch 90 which is normally closed. Thus the motor 105 can be started by operating the push-button switch 108. Opening of the switch 90 by an over-length bolt, of course, interrupts the circuit for the coil 107c, deenergizing the relay and stopping the motor 105. Motor 105 will remain stopped until the over-length bolt is removed and push button switch 108 is manually closed. Removal of the over-length bolt is facilitated by the hinged mounting of bar 72a.

It will be apparent from the foregoing description that the invention is characterized by numerous advantages over bolt-delivering devices known heretofore. The apparatus will handle any form of bolt-like members having heads larger than their shanks, whether the heads and shanks are cylindrical or of other shape. The apparatus automtically controls the feed of bolts by stopping the elevator and the trough conveyor when the magazine is filled to a predetermined height. Re-starting is prevented until the magazine has been emptied to a predetermined level, thus eliminating frequent starting and stopping.

The elevator delivers small groups of bolts successively to the receiving trough and in scattered relation along the length thereof. This permits the trough conveyor to arrange the bolts in the bottom slot thereof without jamming or piling up. The trough conveyor and the magazine slot may be easily adjusted to accommodate various sizes of bolt shanks and bolt heads. The desired rate of feed may be obtained by controlling the speed of the motor driving the elevator. The automatically operated gate in the bottom of the storage hopper permits easy entry of the conveyor flights while preventing bolts from falling through the opening between flights.

The motion of the automatically operated gate also serves to agitate the mass of bolts in the hopper, thus aiding the bolts in their gravitation toward the elevator flights. Continuity of feed is not affected by the size of the storage hopper, nor the quantity of bolts in the hopper. It has already been mentioned that the hopper is adapted to be designed for a large capacity so that it need be filled only relatively infrequently.

The provision for descent of the conveyor trough pusher bars into the slot of the trough as they progress therealong causes the bolts near the lower end of the trough to be agitated and, together with the monitor fingers, causes any bolts which have been carried up out of proper position to be released for downward sliding in the trough until properly positioned with their shanks in the slot.

It will be understood that a limited number of bolts are normally maintained in the magazine and that the supply of bolts therein is replenished periodically as bolts are removed from the lower end by the processing mechanism. At the same time, any accumulation of excess bolts in the magazine stops the entire feeding operation. The over-length detector protects the processing mechanism from damage which might result from the feeding thereto of a bolt having a length greater than that for which the mechanism is set.

Although I have illustrated and described but a preferred embodiment of the invention, it will be recognized that changes in the details of construction disclosed may be made without departure from the spirit of the invention or the scope of the appended claims.

I claim:

1. Apparatus for feeding bolts or the like comprising a magazine including sloping guide rails down which the bolts slide, a conveyor delivering bolts in order to the magazine, a motor driving said conveyor, a switch for controlling the operation of said motor, said switch being opened by means actuated by an accumulation of bolts adjacent the upper end of the magazine, said switch being closed when the bolts pass through the upper end portion of the magazine, a second switch for controlling the operation of said motor, said second switch being opened by means actuated by the presence of bolts adjacent the lower end of the magazine, said second switch being closed when no bolts are in the guide rails in the lower portion of the magazine, and an electrical circuit including said switches connected in series with each other and said motor whereby an accumulation of bolts adjacent the upper end of the magazine opens the first switch and stops the motor, and whereby the removal of bolts from the magazine closes both said switches and starts the motor.

2. Apparatus for feeding bolts or the like comprising a magazine including sloping guide rails down which the bolts slide, a conveyor delivering bolts in order to the magazine, an electric controller for starting and stopping said conveyor, actuating means for the controller including a member movable into the space between the rails and adapted to be arrested by the piling up of bolts in the magazine to a predetermined height, said member actuating the controller to stop the conveyor when movement of the member is arrested and permitting the controller to start the conveyor when the member moves into the space between the rails, a second electric controller below said first-mentioned controller and held open by the bolts descending in the magazine past said second controller, said controllers forming part of an electric circuit whereby actuation of the first controller tending to start the conveyor will not be effective until the bolts in the magazine have passed the second controller and closed the second controller.

3. Apparatus for feeding bolts or the like as described in claim 2 in which the apparatus also includes an elevator delivering individual quantities of bolts to the conveyor, and in which the electric controller start and stop said elevator.

CHARLES D. OVERLY.

REFERENCES CITED

The following references are of record in the file of this patent:

UNITED STATES PATENTS

| Number | Name | Date |
| --- | --- | --- |
| Re. 13,209 | Dauner | Feb. 21, 1911 |
| 326,153 | Richards | Sept. 15, 1885 |
| 396,467 | Coleman | Jan. 22, 1889 |
| 913,018 | Lawrence | Feb. 23, 1909 |
| 945,658 | Wight | Jan. 4, 1910 |
| 964,191 | Steele | July 12, 1910 |
| 1,154,244 | Graham | Sept. 21, 1915 |
| 1,164,975 | Barter | Dec. 21, 1915 |
| 1,462,512 | Loew | July 24, 1923 |
| 1,515,774 | Jones | Nov. 18, 1924 |
| 1,781,792 | Rodman | Nov. 18, 1930 |
| 1,794,794 | Newton | Mar. 3, 1931 |
| 1,966,056 | Wilcox | July 10, 1934 |
| 2,244,817 | Wilcox | June 10, 1941 |
| 2,252,498 | Flaws | Aug. 12, 1941 |
| 2,284,698 | Trotter | June 2, 1942 |